(12) United States Patent
Matsumoto et al.

(10) Patent No.: US 7,695,554 B2
(45) Date of Patent: Apr. 13, 2010

(54) INK JET INK, METHOD OF PRODUCING INK JET INK, INK JET RECORDING METHOD, INK CARTRIDGE, AND YELLOW INK

(75) Inventors: Nobuyuki Matsumoto, Tokyo (JP); Shinichi Hakamada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 152 days.

(21) Appl. No.: 11/912,468

(22) PCT Filed: Jun. 8, 2006

(86) PCT No.: PCT/JP2006/311972

§ 371 (c)(1),
(2), (4) Date: Oct. 24, 2007

(87) PCT Pub. No.: WO2006/132433

PCT Pub. Date: Dec. 14, 2006

(65) Prior Publication Data

US 2009/0074967 A1    Mar. 19, 2009

(30) Foreign Application Priority Data

Jun. 10, 2005    (JP)    ............................. 2005-170334

(51) Int. Cl.
*C09D 11/02* (2006.01)
*B41J 2/01* (2006.01)

(52) U.S. Cl. .................................. 106/31.28; 347/100
(58) Field of Classification Search ............... 106/31.28; 347/100
See application file for complete search history.

(56) References Cited

U.S. PATENT DOCUMENTS

| 5,268,459 A | 12/1993 | Gregory et al. ............. 534/758 |
| 6,043,297 A | 3/2000 | Sano ........................... 523/160 |
| 6,284,029 B1 | 9/2001 | Sano et al. ................. 106/31.6 |
| 6,398,355 B1 | 6/2002 | Shirota et al. ............... 347/100 |

(Continued)

FOREIGN PATENT DOCUMENTS

AU    2002-362191    7/2003

(Continued)

OTHER PUBLICATIONS

Machine translation of JP 2003/020428, Jan. 2003.*

*Primary Examiner*—Helene Klemanski
(74) *Attorney, Agent, or Firm*—Fitzpatrick, Cella, Harper & Scinto

(57) ABSTRACT

An object of the present invention is to provide an ink jet ink capable of suppressing bleeding and excellent in color developability, a method of producing the ink with an aid of a unit preferable in terms of economy and environmental protection, and an ink jet recording method providing an image which can suppress the occurrence of bleeding and which is excellent in color developability. The ink jet ink comprises water, coloring materials, and a water-soluble organic solvent, in which the coloring materials comprise at least one dye selected from the group consisting of C.I. Direct Yellow 86, C.I. Acid Yellow 23, C.I. Direct Yellow 173, C.I. Direct Yellow 132, and C.I. Direct Yellow 59, and C.I. Pigment Yellow 74; the water-soluble organic solvent comprises a poor medium for C.I. Pigment Yellow 74; and a surface tension of the ink is 34.0 mN/m or more.

11 Claims, 2 Drawing Sheets

U.S. PATENT DOCUMENTS

| | | | |
|---|---|---|---|
| 6,435,658 B1 | 8/2002 | Kato et al. | 347/43 |
| 6,474,803 B1 | 11/2002 | Shirota et al. | 347/100 |
| 6,540,329 B1 | 4/2003 | Kaneko et al. | 347/43 |
| 6,552,156 B2 | 4/2003 | Noguchi et al. | 528/71 |
| 6,582,070 B2 | 6/2003 | Takada et al. | 347/100 |
| 6,676,254 B2 | 1/2004 | Nagashima et al. | 347/100 |
| 6,698,875 B2 * | 3/2004 | Onishi et al. | 347/100 |
| 6,698,876 B2 | 3/2004 | Sato et al. | 347/100 |
| 6,918,955 B2 | 7/2005 | Yokoyama et al. | 106/31.28 |
| 6,929,362 B2 | 8/2005 | Takada et al. | 347/100 |
| 6,932,465 B2 | 8/2005 | Nito et al. | 347/96 |
| 6,935,732 B2 | 8/2005 | Takada et al. | 347/96 |
| 7,195,340 B2 | 3/2007 | Nagashima et al. | 347/56 |
| 7,208,032 B2 | 4/2007 | Hakamada et al. | 106/31.27 |
| 7,276,112 B2 | 10/2007 | Tokuda et al. | 106/31.6 |
| 7,291,214 B2 | 11/2007 | Tsuji et al. | 106/31.8 |
| 7,297,203 B2 | 11/2007 | Takada et al. | 106/31.8 |
| 2005/0022695 A1 | 2/2005 | Yokoyama et al. | 106/31.28 |
| 2005/0204955 A1 | 9/2005 | Nagashima et al. | 106/31.59 |
| 2006/0007288 A1 | 1/2006 | Takada et al. | 347/100 |
| 2006/0007289 A1 | 1/2006 | Nito et al. | 347/100 |
| 2006/0098067 A1 | 5/2006 | Imai et al. | 347/100 |
| 2006/0098068 A1 | 5/2006 | Hakamada et al. | 347/100 |
| 2006/0103704 A1 | 5/2006 | Hakamada et al. | 347/100 |
| 2006/0125895 A1 | 6/2006 | Nito et al. | 347/100 |
| 2007/0097155 A1 | 5/2007 | Imai et al. | 347/1 |
| 2007/0097156 A1 | 5/2007 | Udagawa et al. | 347/1 |
| 2007/0103525 A1 | 5/2007 | Yamamoto et al. | 347/100 |
| 2009/0053414 A1 * | 2/2009 | Fujioka et al. | 106/31.78 |

FOREIGN PATENT DOCUMENTS

| | | |
|---|---|---|
| EP | 1460111 | 9/2004 |
| JP | 60-45667 | 10/1985 |
| JP | 2-233781 | 9/1990 |
| JP | 4-233975 | 8/1992 |
| JP | 11-199811 | 7/1999 |
| JP | 2000-281952 | 10/2000 |
| JP | 2003-20428 | 1/2003 |
| JP | 2004-27204 | 1/2004 |
| JP | 2004-136580 | 5/2004 |
| JP | 2005-120310 | 5/2005 |
| JP | 2006-8908 | 1/2006 |
| WO | WO 03/055952 | 7/2003 |
| WO | WO 2005/037937 | 4/2005 |

* cited by examiner

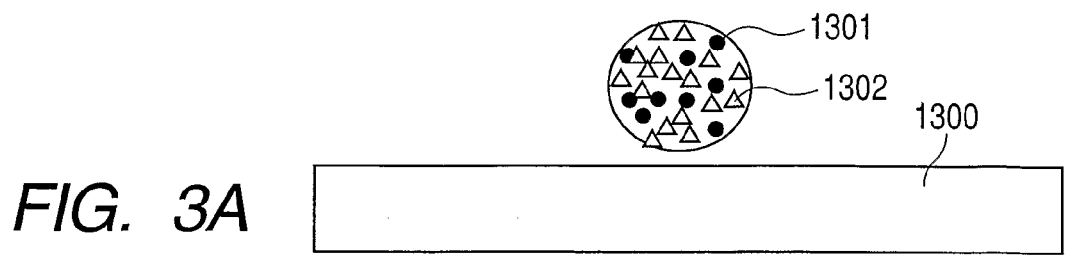
FIG. 3A
FIG. 3B
FIG. 3C
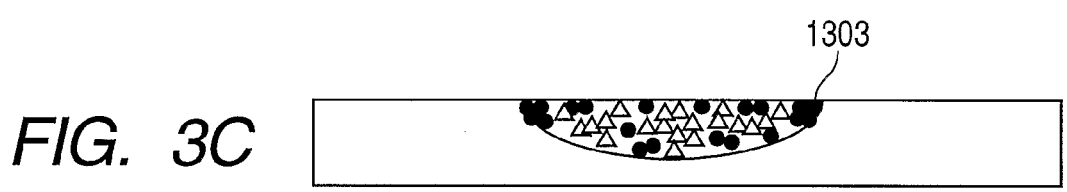
FIG. 3D
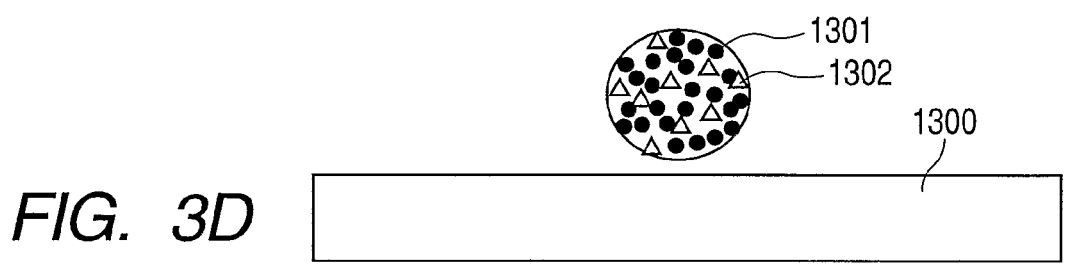
FIG. 3E
FIG. 3F
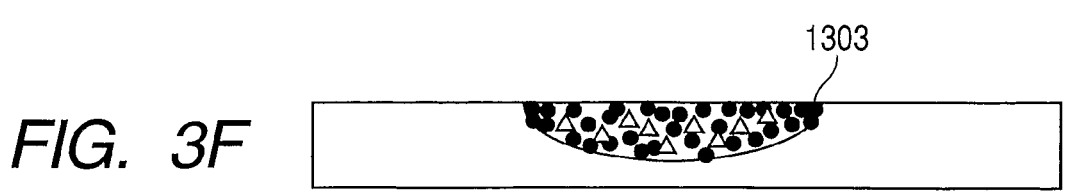

INK JET INK, METHOD OF PRODUCING INK JET INK, INK JET RECORDING METHOD, INK CARTRIDGE, AND YELLOW INK

TECHNICAL FIELD

The present invention relates to an ink jet ink, a method of producing an ink jet ink, an ink jet recording method, an ink cartridge, and a yellow ink.

BACKGROUND ART

An ink jet recording method is a recording method involving applying an ink droplet to any one of recording media such as plain paper and glossy media to form an image, and had become rapidly widespread owing to a reduction in its cost and an improvement in its recording rate. With the rapid spread of a digital camera in addition to an improvement in quality of an image recorded by the method, the method has been generally used as a method of outputting an image comparable to silver salt photography. Under the circumstances, in order to provide a recorded matter meeting the needs of the times, ideas have been proposed for not only, of course, the properties of ink for use in the ink jet recording method but also the properties of a coloring material.

A coloring material for use in an ink jet yellow ink is expected to migrate hardly, that is, to cause a change in color tone of an image and the color fading of the image hardly. There has been proposed the use of C.I. Direct Yellow 86 or C.I. Direct Yellow 173 as a dye having such property (see, for example, Japanese Patent Application Laid-open No. H02-233781 and Japanese Patent Application Laid-open No. H04-233975).

In addition, a pigment inferior to a dye in color developability but excellent in, for example, the water resistance of an image has been used as a coloring material. In particular, the color developability of C.I. Pigment Yellow 74 is excellent as compared to that of any other pigment having a yellow hue. Therefore, there have been a large number of proposals concerning the use of C.I. Pigment Yellow 74 as a coloring material for the yellow ink (see, for example, Japanese Patent Application Laid-open No. H11-199811 and Japanese Patent Application Laid-open No. 2000-281952). Furthermore, there has been proposed the combined use of a dye and a pigment as coloring materials for the purpose of improving the storage stability and color developability of ink (see, for example, Japanese Patent Application Publication No. S60-45667).

DISCLOSURE OF THE INVENTION

However, in accordance with an improvement in ink jet technology, the output of a recorded matter having a higher level of the image quality of an image obtained by means of an ink jet recording method than the conventional one has been requested in recent years. In particular, a recorded matter for use in an office is requested to have high color developability like a recorded matter provided by a laser beam printer using powder toner, and to have suppressed bleeding between colors.

For example, it has been found that some users may not be satisfied with the resultant recorded matter depending on an environment where recording is performed and the kind of a recording medium when an image is formed at a high speed by using such dye as described above as a coloring material. That is, for example, in the case where an image is formed with any other ink except the yellow ink (especially the black ink) to be adjacent to an image formed with the yellow ink, a phenomenon in which the quality of an image reduces may occur owing to the bleeding of a color at a boundary between the regions of different colors and the uneven mixing of the inks. On the other hand, when a pigment is used as a coloring material for the purpose of obtaining durability such as light resistance and water resistance in an image formed on plain paper, the following problem may occur. That is, for example, even the use of C.I. Pigment Yellow 74 excellent in color developability may be unable to provide the color developability of an image, in particular, the chroma of a red image formed with the yellow ink and magenta ink sufficiently. In view of the foregoing, the present inventors have acknowledged that it is important to provide an image which is capable of suppressing bleeding much or little better than conventional ink jet ink and which is excellent in color developability.

In view of the foregoing, a first object of the present invention is to provide a novel ink jet ink providing an image which has suppressed bleeding and which is excellent in color developability. More preferably, a object of the present invention is to provide a novel ink jet ink providing an image with suppressed bleeding, for example, in the case where an image is formed to be adjacent to an image formed with a black ink.

In addition, a second object of the present invention is to provide a method of producing an ink jet ink providing an image which has suppressed bleeding and which is excellent in color developability, by an economical means which is preferable also from the viewpoint of environmental protection.

Furthermore, another object of the present invention is to provide an ink jet recording method and an ink cartridge each using an ink jet ink providing an image which has suppressed bleeding and which is excellent in color developability.

The present inventors have made extensive studies with a view to solving such problems as described above.

That is, according to a first aspect of the present invention, in order to attain the first object, there is provided an ink jet ink comprising water, coloring materials, and a water-soluble organic solvent, in which; the coloring materials comprise at least one dye selected from the group consisting of C.I. Direct Yellow 86, C.I. Acid Yellow 23, C.I. Direct Yellow 173, C.I. Direct Yellow 132, and C.I. Direct Yellow 59, and C.I. Pigment Yellow 74; the water-soluble organic solvent comprises a poor medium for C.I. Pigment Yellow 74; and a surface tension of the ink is 34.0 mN/m or more.

Moreover, according to a second aspect of the present invention, in order to attain the first object, there is also provided a yellow ink to be used in combination with a black ink comprising water, carbon black, and a water-soluble organic solvent, comprising as coloring materials at least one dye selected from the group consisting of C.I. Direct Yellow 86, C.I. Acid Yellow 23, C.I. Direct Yellow 173, C.I. Direct Yellow 132, and C.I. Direct Yellow 59, and C.I. Pigment Yellow 74; and a water-soluble organic solvent comprising a poor medium for C.I. Pigment Yellow 74, in which a surface tension of the yellow ink is 34.0 mN/m or more.

Furthermore, according to a third aspect of the present invention, in order to attain the second object, there is provided a method of producing the above-mentioned ink jet ink, comprising the step of injecting an ink comprising at least one dye selected from the group consisting of C.I. Direct Yellow 86, C.I. Acid Yellow 23, C.I. Direct Yellow 173, C.I. Direct Yellow 132, and C.I. Direct Yellow 59 as coloring material into an ink cartridge storing ink which comprises C.I. Pigment Yellow 74 and a poor medium for C.I. Pigment Yellow 74, and which has a surface tension of 34.0 mN/m or more.

In addition, according to another aspect of the present invention, in order to attain the third object, there is provided an ink jet recording method using the above-mentioned ink jet ink, the yellow ink, or ink jet ink produced by the above-mentioned method of producing an ink jet ink, and an ink cartridge storing any one of the above ink jet inks.

According to the present invention, there can be provided an ink jet ink and a yellow ink each capable of providing an image which has suppressed bleeding and improved color developability (especially, improved chroma of a red image). There can be also provided a method of producing an ink jet ink which can produce the above-mentioned ink by a means which is economical and preferable also from the viewpoint of environmental protection by reusing an ink jet ink which remains in an ink cartridge or the like. Furthermore, there can be provided an ink jet recording method and an ink cartridge each capable of providing an image which has suppressed bleeding and improved color developability (especially, improved chroma of a red image).

BRIEF DESCRIPTION OF THE DRAWINGS

FIGS. 3A, 3B, 3C, 3D, 3E, and 3F are schematic views illustrating a process commencing on the application of ink to a recording medium and ending on the fixation of the ink to the recording medium.

BEST MODE FOR CARRYING OUT THE INVENTION

Figure 1:
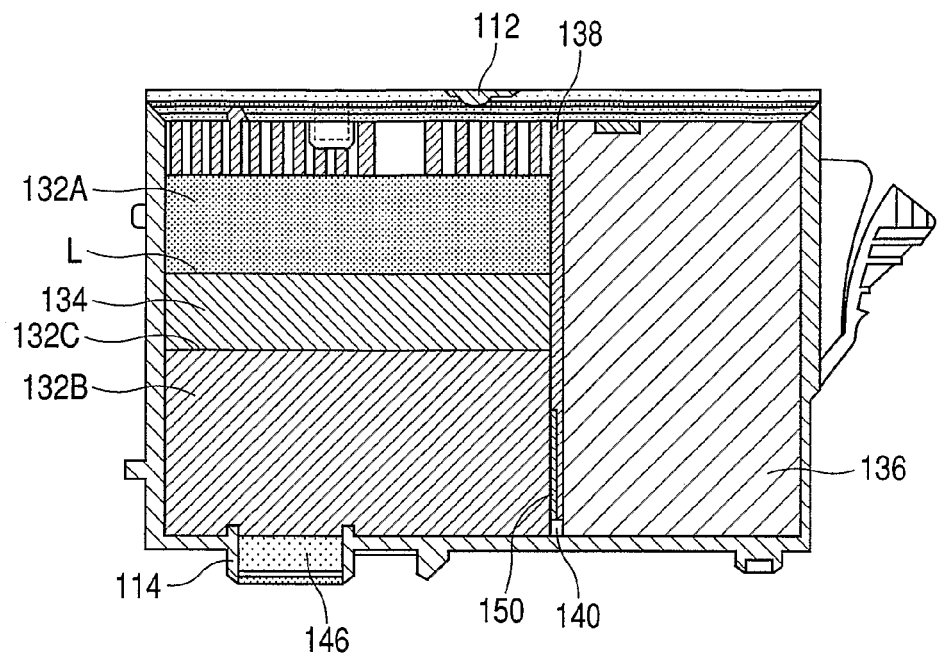
FIG. 1 is a schematic cross-sectional view showing an ink cartridge which is suitable to perform recording by using an ink according to the present invention.

The present invention will be described in detail by way of a preferred embodiment. Hereinafter, in the present invention, an ink jet ink may be referred to as an "ink", and C.I. Pigment Yellow 74 may be referred to as a "yellow pigment".

The ink of the present invention has a hue of yellow. The ink according to the present invention must contain a specific dye and a specific yellow pigment as coloring materials. One or more kinds of dyes selected from the group consisting of C.I. Direct Yellow 86, C.I. Acid Yellow 23, C.I. Direct Yellow 173, C.I. Direct Yellow 132, and C.I. Direct Yellow 59 are used as the dye, and C.I. Pigment Yellow 74 is used as the yellow pigment. Furthermore, the ink according to the present invention must contain a poor medium for C.I. Pigment Yellow 74 as a water-soluble organic solvent, and must have a surface tension of 34.0 mN/m or more.

In general, an image formed by using ink containing a pigment as a coloring material is superior to an image formed by using ink containing a dye as a coloring material in durability such as light resistance and water resistance, but may be unable to provide sufficient color developability. Therefore, a dye and a pigment have been heretofore used in combination as coloring materials for providing excellent durability and excellent color developability like the invention described in Japanese Patent Application Publication No. S60-45667 described above. However, the present inventors have conducted an investigation, and, as a result, they have found the following: simply using a dye and a pigment in combination does not reach a level at which large effects in terms of the acquisition of excellent color developability and the suppression of bleeding as objects of the present invention as a coloring material can be obtained as compared to conventional ink containing a dye or a pigment.

In view of the foregoing, the present inventors have conducted an additional investigation. As a result, they have found that the above-described effects of the present invention to be obtained are significant when ink contains a poor medium for a pigment. In particular, in the case of ink having a yellow hue, a suppressing effect on bleeding and an improving effect on color developability, in particular, the chroma of a red image to be obtained are found to be additionally significant when kinds of a dye and a pigment in ink are adjusted, and a ratio between the contents of the dye and the pigment establishes a specific relationship.

The reason why the use of the ink according to the present invention exerts a significant improving effect on color developability is not clearly revealed. However, the present inventors consider the reason why excellent color developability can be obtained to be as described below. When ink contains a poor medium for a yellow pigment, the agglomeration of the yellow pigment resulting from the evaporation and permeation of water component of the ink occurs quickly after the ink has been applied to a recording medium. As a result, the aggregate of the yellow pigment generated near the surface of the recording medium suppresses the permeation of a dye in the depth direction of the recording medium. Furthermore, the dye dyes between the aggregate of the yellow pigment present near the surface of the recording medium, so the dyeing ratio of an image increases.

The reason why the use of the ink according to the present invention can suppress bleeding is not clearly revealed. However, the present inventors consider the reason why bleeding can be suppressed to be as described below. When the ink according to the present invention is applied to a recording medium 1300, a dye 1302 in the ink spreads along a fiber in the same manner as in conventional ink after the ink has adhered to the recording medium 1300. Meanwhile, a yellow pigment 1301 in the ink produces an aggregate because a ratio between the yellow pigment and a poor medium in the ink increases abruptly resulting from the evaporation of water immediately after the adhesion of the ink to the recording medium (see FIG. 3A and FIG. 3B).

The aggregate 1303 is produced quickly as the ratio of the poor medium in the ink increases. Accordingly, the aggregate 1303 is produced as if a bank of the yellow pigment were formed at not the central portion of a dot but the outer edge portion of the dot. As a result, the spreading of the dye in a lateral direction can be suppressed (see FIG. 3C).

The inventors consider that, with such mechanism, even when any other ink except the ink according to the present invention is applied to be adjacent to a dot (image) formed with the ink according to the present invention, bleeding can be suppressed well as compared to conventional ink containing both a dye and a yellow pigment as coloring materials.

At this time, the following constitution may be considered to be able to suppress bleeding with improved effectiveness. That is, the yellow ink is used in combination with a black ink, and carbon black is used as a coloring material of the black ink, and the ink according to the present invention described above is used as the yellow ink. At this time, a poor medium for carbon black is preferably incorporated into the black ink. Furthermore, a poor medium for C.I. Pigment Yellow 74 in the yellow ink to be used in combination with the black ink is preferably a poor medium for carbon black in the black ink because bleeding can be particularly effectively suppressed. The reason why such constitution as described above can particularly effectively suppress bleeding may be as described below. That is, when the coloring materials of the respective inks contact with each other on a recording medium or at a portion where the coloring materials permeate into the recording medium (depth direction), aggregates are rapidly formed, so the mixing of the coloring materials of the respective inks is substantially prevented. In the present invention, carbon black is particularly preferably self-dispersion carbon black in which at least one ionic group is bonded to the surface of a carbon black particle directly or via another atomic group. In addition, a poor medium in each of the yellow ink and the black ink particularly preferably shows the maximum Ka value out of respective Ka values of water-soluble organic solvents in the inks.

Here, a Ka value determined by a Bristow method will be described. The value is used as an indication for the permeability of a liquid into a recording medium. Hereinafter, ink will be described as an example. Where the permeability of an ink is represented by the ink quantity V per 1 m$^2$, the penetration quantity V (mL/m$^2$=µm) of the ink into the recording medium after a lapse of a stated time t after ink droplets have been ejected is represented by the following Bristow's equation (Eq. (1)).

$$V = V_r + Ka(t - t_w)^{1/2} \qquad \text{Eq. (1)}$$

Almost all the ink immediately after applied to a recording medium is absorbed in the recording medium at uneven portions of its surface (rough portions on the surface of the recording medium), and is hardly permeated into the recording medium (depth direction). A time for which this takes place is a contact time ($t_w$), and the quantity of the ink absorbed at the contact time in the recording medium at its uneven portions is $V_r$. When time lapses beyond the contact time after the ink is applied to the recording medium, the ink is permeated into the interior (depth direction) of the recording medium in a quantity proportional to the ½ power of a time lapsing beyond the contact time, i.e., $(t-t_w)^{1/2}$, so that the permeation quantity V increases. The Ka is a proportional coefficient of the portion of this increase, and takes a value corresponding to the rate of permeation. The Ka value can be measured by using, for example, a dynamic permeability tester for a liquid according to the Bristow method (for example, trade name: dynamic permeability tester S; manufactured by Toyo Seiki Seisaku-Sho, Ltd.).

The Ka value according to the Bristow method in the present invention is a value measured by using plain paper as a recording medium. Specific examples of the plain paper include: PB paper (manufactured by Canon Inc.) for use in a copying machine utilizing an electrophotographic method, a page printer (laser beam printer), or a printer utilizing an ink jet recording method; and PPC paper for use in a copying machine utilizing an electrophotographic method. The assumed measurement environment is an environment such as an ordinary office (for example, an environment having a temperature of 20° C. to 25° C. and a humidity of 40% to 60%).

The reason why the use of the ink according to the present invention exerts a significant improving effect on the chroma of a red image is not clearly revealed. However, the present inventors consider the reason why excellent chroma of a red image can be obtained to be as described below.

An image formed by using a yellow pigment as a coloring material is inferior to an image formed by using a dye as a coloring material in color developability. However, when ink contains a poor medium for a yellow pigment like the ink according to the present invention, the aggregate of the yellow pigment can be formed to be closer to the surface of a recording medium than conventional ink containing a yellow pigment. The phenomenon in which the yellow pigment aggregates to be closer to the surface of the recording medium than the conventional ink containing a yellow pigment occurs via a mechanism similar to that described above. That is, an aggregate is produced because a ratio between a yellow pigment and a poor medium in ink increases abruptly resulting from the evaporation of water immediately after the adhesion of the ink to a recording medium. The aggregate is produced quickly as the ratio of the poor medium in the ink increases. Accordingly, the aggregate is produced as if a bank of the yellow pigment were formed at not the central portion of a dot but the outer edge portion of the dot. As a result, the aggregate is produced near the surface of the recording medium before a coloring material spreads in a lateral direction (see FIG. 3D and FIG. 3E). When ink having a constitution capable of causing such phenomenon additionally contains a dye as a coloring material, the dye dyes between the aggregate of the yellow pigment. Therefore, a dyeing ratio increases near the surface of the recording medium (see FIG. 3F). The present inventors consider that the chroma of a red image increases via the above-described mechanism.

According to an investigation conducted by the present inventors, the permeation rate of ink into a recording medium must be suppressed to some extent for obtaining the above-described three effects: color developability, the suppression of bleeding, and the chroma of a red image. To be more specific, the ink according to the present invention must have a surface tension of 34.0 mN/m or more at 25° C. Furthermore, the surface tension is preferably 38.0 mN/m or more at 25° C. The reason for this as described below. When the surface tension of the ink is less than 34.0 mN/m, the permeation rate of the ink into a recording medium is larger than the rate of agglomeration of the yellow pigment. Therefore, sufficiently excellent color developability cannot be obtained in some cases even though bleeding can be suppressed. In addition, the surface tension of the ink according to the present invention is preferably 41.0 mN/m or less. When the surface tension of the ink exceeds 41.0 mN/m, sufficient fixability of the ink on a recording medium may not be obtained, or bleeding may not be sufficiently suppressed.

A conventional ink set having a suppressing effect on bleeding has a constitution in which the permeation rate of each of inks in the ink set into a recording medium is increased so that the inks are prevented from mixing with each other on the recording medium. In particular, color ink is often so-called permeation type ink for suppressing bleeding between multiple color inks. For example, even when ink using a coloring material satisfying the constitution of the present invention is used like an example of Japanese Patent Application Laid-open No. 2003-20428, excellent color developability as an effect of the present invention cannot be obtained. This is because the ink is the so-called permeation type ink containing a large amount of an alkanediol or surfactant as a water-soluble organic solvent having large permeability although a dye and a pigment are used in combination as coloring materials.

A point of the present invention lies in that bleeding can be suppressed even when permeability is suppressed to some extent unlike the case of conventional, so-called permeation type ink suppressing bleeding as described above. In the present invention, a temperature upon measurement of a surface tension was 25° C., and a Kyowa CBVP-2 type surface tension meter (manufactured by Kyowa Kagaku Co., Ltd.) was used for measuring the surface tension.

Furthermore, in a more preferred embodiment of the present invention, a ratio (B/A) of the content B (mass %) of the poor medium to the content A (mass %) of C.I. Pigment Yellow 74 in the ink according to the present invention is preferably 0.75 or more and 4 or less, more preferably 1 or more and 4 or less. The content A and the content B each represent a content (mass %) with respect to the total mass of the ink. When the ratio (B/A) of the content B to the content A is 0.75 or more, the aggregate of the yellow pigment with an increased size can be formed near the surface of a recording medium. Therefore, particularly excellent color developability can be obtained when the content (mass %) of the yellow pigment in the ink is 4 mass % or more. Furthermore, when the ratio (B/A) of the content B to the content A is 1 or more, a large aggregate of the yellow pigment can be easily formed near the surface of the recording medium even when the content (mass %) of the yellow pigment in the ink is less than 4 mass %. Therefore, bleeding upon formation of an image on plain paper can be easily suppressed, and excellent color developability can be easily obtained. In addition, when the ratio (B/A) of the content B to the content A is 4 or less, the ink can be excellent in storage stability even when the ink is stored for a long time period. To be specific, effects such as: an effect in which a rate of change in the average particle size of the yellow pigment in the ink is so small that the ink does not substantially thicken; and a preventing effect on the generation of a gel-like precipitate in the ink can be obtained.

In addition, the following constitution is preferable for obtaining excellent color developability when the ink according to the present invention is applied to a recording medium. A ratio C:B between the content B (mass %) of the poor medium in the ink according to the present invention and the content C (mass %) of a good medium in the ink is preferably 10:5 or more and 10:30 or less. In other words, when the content C is 10, the content B is preferably 5 or more and 30 or less (that is, a ratio C/B is preferably 0.3 or more and 2 or less). Setting a ratio between the contents of the poor medium and the good medium in the ink within the above-described range can result in the formation of the aggregate of the yellow pigment near the surface of the recording medium. As a result, excellent color developability can be obtained. The definition of each of the poor medium and the good medium in the present invention, and a method of selecting each of the solvents will be described later.

<Content of Coloring Material>

When the content of a dye in ink is excessively large, the water resistance or the like of an image may reduce as compared to conventional ink containing a pigment. Therefore, the content of a dye is preferably determined in an appropriate manner particularly when the ink according to the present invention is used as ink placing emphasis on the durability of an image.

A ratio between the contents of the yellow pigment and the dye in the ink according to the present invention is preferably set as described below. The content A and the content D each represent a content (mass %) with respect to the total mass of the ink. When the content of the dye in the ink is larger than the content of the yellow pigment, a ratio of the content A (mass %) of the yellow pigment in the ink to the content D (mass %) of the dye in the ink, that is, a value for A/D×100% is preferably 7% or more and 34% or less. This is because, when the ratio of the content of the yellow pigment in the ink to the content of the dye in the ink is 7% or more, an aggregate is formed in an amount enough to suppress the spreading of the dye in a lateral direction in a recording medium, so bleeding can be suppressed with improved effectiveness. In addition, when the ratio of the content of the yellow pigment in the ink to the content of the dye in the ink is 34% or less, the degree of deterioration of an image occurring owing to a difference in light resistance between a portion in a recording medium to which the dye is applied and a portion in the recording medium to which the yellow pigment is applied hardly varies. Therefore, an image with a uniformized color fading balance between the portion in the recording medium to which the dye is applied and the portion in the recording medium to which the yellow pigment is applied can be obtained when the image is stored for a long time period.

In addition, when the content of the yellow pigment in the ink is larger than the content of the dye, a ratio of the content D (mass %) of the dye in the ink to the content A (mass %) of the yellow pigment in the ink, that is, a value for D/A×100% is preferably 5% or more and 25% or less. Setting the ratio of the content of the dye in the ink to the content of the yellow pigment in the ink to 5% or more can provide excellent color developability. In addition, when the ratio of the content of the dye in the ink to the content of the yellow pigment in the ink is 25% or less, the degree of an image occurring owing to a difference in light resistance between a portion in a recording medium to which the dye is applied and a portion in the recording medium to which the yellow pigment is applied hardly varies. Therefore, an image with a uniformized color fading balance between the portion in the recording medium to which the dye is applied and the portion in the recording medium to which the yellow pigment is applied can be obtained when the image is stored for a long time period.

The content of the yellow pigment and the content of the dye in the ink according to the present invention are each preferably set as described below. First, when the content of the dye in the ink is larger than the content of the yellow pigment, the content (mass %) of the yellow pigment in the ink is preferably 0.2 mass % or more, more preferably 0.6 mass % or more and 2 mass % or less, with respect to the total mass of the ink. If the content of the dye in the ink is larger than the content of the yellow pigment and the content of the yellow pigment is less than 0.2 mass %, effects such as excellent color developability and the suppression of bleeding cannot be obtained in some cases. This is because a suppressing action on a phenomenon in which the dye spreads in a lateral direction cannot be sufficiently obtained when plain paper is used as a recording medium. In addition, when the content of the dye in the ink is larger than the content of the yellow pigment, the content (mass %) of the dye in the ink is preferably 3.0 mass % or more and 3.4 mass % or less with respect to the total mass of the ink. This is because, if the content of the dye in the ink is larger than the content of the yellow pigment and the content of the dye is less than 3.0 mass %, excellent color developability cannot be obtained in some cases, and, if the content of the dye exceeds 3.4 mass %, excellent durability cannot be obtained in some cases.

On the other hand, when the content of the yellow pigment in the ink is larger than the content of the dye, the content (mass %) of the yellow pigment in the ink is preferably 4.0 mass % or more and 6.0 mass % or less with respect to the total mass of the ink. If the content of the yellow pigment in the ink is larger than the content of the dye and the content of the yellow pigment is 4.0 mass % or more, excellent color developability can be obtained. In addition, when the content of the yellow pigment in the ink is larger than the content of the dye, the content (mass %) of the dye in the ink is preferably 0.2 mass % or more, more preferably 0.6 mass % or more and 1.1 mass % or less, with respect to the total mass of the ink. If the content of the yellow pigment in the ink is larger than the content of the dye and the content of the dye is 0.6 mass % or more, the dye can dye between the aggregate of the yellow pigment present near the surface of a recording medium, so excellent color developability can be obtained.

<Definition of Each of Poor Medium and Good Medium>

The ink according to the present invention contains C.I. Pigment Yellow 74 in a state where C.I. Pigment Yellow 74 is dispersed into an aqueous medium. The followings can be used as the above-mentioned C.I. Pigment Yellow 74. For example, a self-dispersion pigment in which at least one ionizable group is bonded to the surface of a pigment particle directly or via another atomic group, and a resin-dispersion pigment dispersed into an aqueous medium by means of a dispersant, a surfactant, or the like can be mentioned.

In the present invention, a water-soluble organic solvent that can stably maintain the dispersed state of a dispersing component of C.I. Pigment Yellow 74 present in the ink in such state as described above is defined as a good medium, and a water-soluble organic solvent that cannot stably maintain the dispersed state is defined as a poor medium.

To be more specific, determination as to whether a water-soluble organic solvent to be used is a poor medium or good medium for the dispersing component of C.I. Pigment Yellow 74 is performed as described below. First, two kinds of dispersion solutions, that is, a dispersion solution X of the dispersing component of C.I. Pigment Yellow 74 containing the water-soluble organic solvent to be determined and a water dispersion solution Y of the pigment dispersion shown below are prepared.

Dispersion solution X: A dispersion solution containing 50 mass % of the water-soluble organic solvent to be determined, 5 mass % of C.I. Pigment Yellow 74, or 5 mass % in total of C.I. Pigment Yellow 74 and a substance contributing to the dispersion of C.I. Pigment Yellow 74, and 45 mass % of water.

Water dispersion solution Y: A water dispersion solution containing 5 mass % of C.I. Pigment Yellow 74, or 5 mass % in total of C.I. Pigment Yellow 74 and a substance contributing to the dispersion of C.I. Pigment Yellow 74, and 95 mass % of water.

Next, the average particle size of C.I. Pigment Yellow 74 after the dispersion solution X has been stored at 60° C. for 48 hours is measured. In addition, the average particle size of C.I. Pigment Yellow 74 in the water dispersion solution Y is measured in the same manner. The average particle size of C.I. Pigment Yellow 74 in the dispersion solution X and the average particle size of C.I. Pigment Yellow 74 in the water dispersion solution Y are defined as a particle size (A) and a particle size (B), respectively. At this time, when the particle size (A) is larger than the particle size (B), the water-soluble organic solvent is determined to be a poor medium. When the particle size (A) is equal to or smaller than the particle size (B), the water-soluble organic solvent is determined to be a good medium.

A method for determination as to whether the water-soluble organic solvent to be used is a poor medium or good medium for the dispersing component of C.I. Pigment Yellow 74 has been described above; provided that determination as to whether the water-soluble organic solvent to be used is a poor medium or good medium can be performed in the same manner as that described above even when carbon black is used as a pigment.

Specific examples of the water-soluble organic solvent as a poor medium used in the present invention include polyethylene glycol 1000 (polyethylene glycol having an average molecular weight of 1,000), 2-pyrrolidone, and 1,5-pentanediol, or the like. In addition, specific examples of a water-soluble organic solvent as a good medium include glycerin and ethylene glycol, or the like. Of course, the poor and good mediums that can be used in the present invention are not limited to those described above.

<Ink Jet Ink>

Next, each component constituting the ink according to the present invention will be described.

[Coloring Material]

The ink according to the present invention must contain C.I. Pigment Yellow 74, which is a pigment, as a coloring material. The reason why C.I. Pigment Yellow 74 out of the other pigments is used in the present invention will be described below. A pigment capable of providing an image having the above-described effects of the present invention, that is, an image which has suppressed bleeding and which is excellent in color developability is not particularly limited to C.I. Pigment Yellow 74. C.I. Pigment Yellow 74 has color developability higher than that of any other pigment having a yellow hue, but has low light resistance as in the case of a dye. Therefore, an effect in which a color fading balance upon long-term storage of a recorded matter is hardly lost may be obtained. In view of the foregoing, C.I. Pigment Yellow 74 is used as a pigment in the present invention.

Furthermore, the ink according to the present invention must contain a specific dye in addition to C.I. Pigment Yellow 74 described above. The term "specific dye" refers to one or more kinds of dyes selected from the group consisting of C.I. Direct Yellow 86, C.I. Acid Yellow 23, C.I. Direct Yellow 173, C.I. Direct Yellow 132, and C.I. Direct Yellow 59. Each of those dyes has properties such as excellent color developability. Therefore, the use of each of those dyes can cope with a recent request for ink jet ink to form an image comparable to silver halide photography.

(C.I. Pigment Yellow 74)

C.I. Pigment Yellow 74 in the ink according to the present invention can be used irrespective of its dispersion method. For example, a resin dispersion type pigment (resin-dispersion pigment) to be dispersed by using a dispersant or a surfactant dispersion type pigment to be dispersed by using a surfactant can be used. A self dispersion type pigment (self-dispersion pigment) which is adapted to be capable of dispersion without the use of a dispersant or the like by introducing a ionizable group to the surface of each of its particles can also be used. Furthermore, there can be used a microcapsule type pigment whose dispersibility is improved by, for example, coating the surface of each of its particles with organic polymers or a polymer-bonded type self-dispersion pigment modified by chemically bonding an organic group containing a polymer to the surface of each of its particles. Of course, in the present invention, the above-exemplified pigments different from each other in a dispersion method can be used in combination. Hereinafter, a pigment that can be used in the present invention will be described.

[Resin Dispersion Pigment]

As described above, a resin dispersion pigment can be used as C.I. Pigment Yellow 74 in the ink according to the present invention. In this case, a hydrophobic pigment is preferably dispersed into an aqueous medium by using a dispersant, a surfactant, or the like. The dispersant or surfactant to be used at this time is not particularly limited, and any one of the following dispersants and surfactants can be used.

An anionic surfactant or a nonionic surfactant may be used as a surfactant. The following may be used as the anionic surfactant. Specifically, for example, a fatty acid salt, an alkyl sulfate, an alkyl benzenesulfonate, an alkyl naphthalenesulfonate, a dialkyl sulfosuccinate, an alkyl phosphate, a formalin condensate of naphthalenesulfonic acid, a polyoxyethylene alkyl sulfate, and substituted derivatives thereof.

The following may be used as the nonionic surfactant. Specifically, for example, a polyoxyethylene alkyl ether, a polyoxyethylene alkyl phenyl ether, a polyoxyethylene fatty acid ester, a sorbitan fatty acid ester, a polyoxyethylene sorbitan fatty acid ester, a polyoxyethylene alkylamine, a glycerin fatty acid ester, an oxyethylene oxypropylene block polymer, and substituted derivatives thereof.

The following may be used as the dispersant. Specifically, for example, block copolymers, random copolymers, and graft copolymers each composed of at least two monomers (at least one of which is a hydrophilic monomer) selected from: styrene and a derivative thereof; vinyl naphthalene and a derivative thereof; a fatty acid alcohol ester of $\alpha,\beta$-ethylenically unsaturated carboxylic acid; acrylic acid and a derivative thereof; maleic acid and a derivative thereof; itaconic acid and a derivative thereof; fumaric acid and a derivative thereof; and vinyl acetate, vinyl alcohol, vinyl pyrrolidone, and acrylamide, and derivatives thereof, and salts of the copolymers. Furthermore, for example, a block copolymer and a random copolymer may be used in combination.

[Microcapsule Type Pigment]

As described above, a microcapsule-type pigment with improved dispersibility, which is obtained by coating the surface of the particles with the organic polymers to prepare a microcapsule, can be used as C.I. Pigment yellow 74 in the ink according to the present invention.

[Self-Dispersion Pigment]

As described above, a self-dispersion pigment which is adapted to enable the dispersion of the pigment without the use of a dispersant or the like by introducing a ionizable group to the surface of the particles can be used as C.I. Pigment yellow 74 in the ink according to the present invention. The self-dispersion pigment preferably has an ionizable group chemically bonded to the surface of a pigment particle either directly or via another atomic group. For example, an ionizable group is preferably selected from the group consisting of —COOM, —$SO_3M$, and —$PO_3H(M)_2$ (M in the formulae represents a hydrogen atom, an alkali metal, ammonium, or an organic ammonium) introduced to the surface of a pigment particle. The other atomic group is preferably an alkylene group having 1 to 12 carbon atoms, a substituted or unsubstituted phenylene group, or a substituted or unsubstituted naphthylene group. A self-dispersion pigment with its surface oxidized can also be suitably used, which is obtained by means of, for example, a method involving oxidizing a pigment with soda hypochlorite, a method involving oxidizing the pigment through a submerged ozone treatment, or a method involving performing an ozone treatment and subjecting the pigment to wet oxidation to modify the surface of the pigment.

[Polymer-Bonded Self-Dispersion Pigment]

As described above, a polymer-bonded type self-dispersion pigment with modified by chemically bonding an organic group containing a polymer to the surface of the particles can be used as C.I. Pigment yellow 74 in the ink according to the present invention. The polymer-bonded type self-dispersion pigment preferably contains a reactant of: a functional group chemically bonded to the surface of the pigment particle either directly or via another atomic group; and a copolymer of an ionic monomer and a hydrophobic monomer. This is because a copolymerization ratio between the ionic monomer and the hydrophobic monomer as materials for forming a copolymer to be used for modifying the surface of the pigment particle can be appropriately changed, and the change allows the hydrophilicity of the modified pigment to be appropriately adjusted. Various properties can also be imparted to the surface of the pigment particle because the kinds of ionic and hydrophobic monomers and the combination of the monomers can be appropriately changed.

[Aqueous Medium]

As described above, the ink according to the present invention is characterized in that it contains C.I. Pigment Yellow 74 as a pigment, a specific dye, and a poor medium for the pigment. Any one of the components to be used in conventional ink jet ink can be used as any other ink component except those described above. For example, any one of the following aqueous media can be used for dissolving or dispersing the above-described yellow pigment and dye in the ink as long as the medium contains a poor medium for the yellow pigment.

As the aqueous medium, it is preferable to use an aqueous medium containing water, or water and a water-soluble organic solvent. The content (mass %) of the water-soluble organic solvent in the ink according to the present invention is preferably 3.0 mass % or more and 50.0 mass % or less with respect to the total mass of the ink. To be specific, for example, any one of the following solvents can be used as the water-soluble organic solvent.

Alkanol having 1 to 4 carbon atoms such as ethanol, isopropanol, n-butanol, isobunanol, secondary butanol, and tertiary butanol; carboxylic amide such as N,N-dimethylformamide or N,N-dimethylacetamide; ketone or ketoalcohol such as acetone, methylethylketone, and 2-methyl-2-hydroxypentane-4-one; cyclic ether such as tetrahydrofuran and dioxane; polyalcohols such as glycerin, ethylene glycol, diethylene glycol, triethylene glycol, tetraethylene glycol, 1,2- or 1,3-propylene glycol, 1,2- or 1,4-butylene glycol, polyethylene glycol, 1,3-butanediol, 1,5-pentanediol, 1,2-hexanediol, 1,6-hexanediol, dithioglycol, 2-methyl-1,3-propanediol, 1,2,6-hexanetriol, an acetylene glycol derivative, and trimethylol propane; alkyl ethers of the polyalcohols such as ethylene glycol monomethyl (or ethyl)ether, diethylene glycol monomethyl (or ethyl)ether, and triethylene glycol monoethyl (or butyl)ether; heterocycles such as 2-pyrrolidone, N-methyl-2-pyrrolidone, 1,3-dimethyl-2-imidazolidinone, and N-methyl morpholine; a sulfur-containing compound such as dimethyl sulfoxide, and urea and an urea derivative.

In addition, deionized water (ion-exchanged water) is preferably used as water. The content (mass %) of water in the ink according to the present invention is preferably 50.0 mass % or more and 90.0 mass % or less with respect to the total mass of the ink in order that the ink may have such an appropriate viscosity that the ink can be stably ejected and clogging at the tip of a nozzle may be suppressed.

[Additives]

In the ink of the present invention, in addition to the above component, various additives such as a surfactant, a pH adjustor, a chelating agent, a rust inhibitor, an antiseptic, a mildew-proofing agent, a UV absorber, a viscosity modifier, a defoaming agent, and a water-soluble polymer may be incorporated.

Examples of a surfactant include, for example, an anionic surfactant, an amphoteric surfactant, a cationic surfactant, and a nonionic surfactant.

Specific examples of the anionic surfactant include as follows. Alkylsulfo carboxylate, $\alpha$-olefin sulfonate, polyoxyethylene alkylether acetate, N-acylamino acid or salts thereof, N-acylmethyl taurine salt, alkyl sulfate polyoxy alkylether sulfate, alkyl sulfate polyoxyethylene alkylether phosphate, a rosin acid soap, a castor oil sulfate ester, a lauryl alcohol sulfate ester, an alkylphenol-type phosphate ester, an alkyl-type phosphate ester, alkylallyl sulfonate, diethyl sulfosuccinate, and diethylhexyl sulfosuccinate dioctyl sulfosuccinate.

Specific examples of the cationic surfactant include a 2-vinyl pyridine derivative and a poly(4-vinyl)pyridine derivative. Specific examples of the amphoteric surfactant include lauryl dimethylamino betaine acetate, 2-alkyl-N-carboxymethyl-N-hydroxyethyl imidazolinium betaine, coconut oil fatty acid amide propyldimethylamino betaine acetate, polyoctyl polyaminoethyl glycine, and an imidazoline derivative.

Specific examples of the nonionic surfactant include as follows. Ethers such as polyoxyethylene nonylphenyl ether, polyoxyethylene octylphenyl ether, polyoxyethylene dodecylphenyl ether, polyoxyethylene lauryl ether, polyoxyethylene oleyl ether, polyoxyethylene alkyl ether, and polyoxyalkykyl alkyl ether; esters such as polyoxyethylene oleic acid, polyoxyethylene oleate, polyoxyethylene distearate, sorbitan laurate, sorbitan monostearate, sorbitan monooleate, sorbitan sesquioleate, polyoxyethylene monooleate, and polyoxyethylene stearate; acetylene glycols such as 2,4,7,9-tetramethyl-5-decine-4,7-diol, 3,6-dimethyl-4-octyn-3,6-diol, and 3,5-dimethyl-1-hexyn-3-ol (for example, Acetylenol EH manufactured by Kawaken Fine Chemicals Co., Ltd., and Surfynol 104, 82, 465 and Olfine STG, manufactured by NISSIN CHEMICAL INDUSTRY CO., LTD).

<Method of Producing Ink Jet Ink>

The ink according to the present invention has only to satisfy the following constitution requirements essential to the present invention. That is, coloring materials must contain a specific dye and C.I. Pigment Yellow 74 as a pigment. The term "specific dye" refers to at least one dye selected from the group consisting of C.I. Direct Yellow 86, C.I. Acid Yellow 23, C.I. Direct Yellow 173, C.I. Direct Yellow 132, and C.I. Direct Yellow 59. In addition, the ink must contain a poor medium for C.I. Pigment Yellow 74 as a water-soluble organic solvent, and must have a surface tension of 34.0 mN/m or more. The ink according to the present invention has only to satisfy the above constitution requirements, and a method of producing the ink and an embodiment of the ink are not particularly limited.

The following embodiment is applicable to the present invention. For example, an ink jet ink produced in accordance with an ordinary method by using the above-described respective components can be exemplified. In another embodiment, the ink according to the present invention can be produced also by the below-mentioned means which is economical and preferable also from the viewpoint of environmental protection by reusing ink which remains in an ink cartridge.

An example of such embodiment is a method of producing ink including the step of injecting ink containing a specific dye into an ink cartridge storing ink containing C.I. Pigment Yellow 74 and a poor medium for C.I. Pigment Yellow 74. The term "specific dye" refers to at least one dye selected from the group consisting of C.I. Direct Yellow 86, C.I. Acid Yellow 23, C.I. Direct Yellow 173, C.I. Direct Yellow 132, and C.I. Direct Yellow 59.

The production of ink by means of the above method enables an ink cartridge containing C.I. Pigment Yellow 74 as a pigment having excellent performance and a poor medium for the pigment to be reused, and can result in a cost reduction. Furthermore, according to the above-mentioned method, it is possible to further obtain the effect that filling of an ink into an ink cartridge which has contained an ink once, or an ink cartridge which has an ink containing portion which contains the ink becomes easy.

<Black Ink>

The ink according to the present invention is particularly preferably a yellow ink to be used in combination with a black ink containing water, carbon black, and a water-soluble organic solvent. It is believed that by adopting such a constitution, the bleeding can be more effectively suppressed. Hereafter, respective components which compose such a black ink will be explained.

[Coloring Materials]

Carbon black in the black ink can be used irrespective of its dispersion method. As is the case with the above-mentioned dispersing method of C.I. Pigment Yellow 74, for example, it is possible to use, for example, a resin dispersion type carbon black (resin-dispersion carbon black) which is dispersed using a dispersant or a surfactant dispersion type carbon black which is dispersed using a surfactant. Moreover, it is possible to use a self-dispersing type carbon black (self-dispersion carbon black) which is made dispersible without using a dispersant or the like by introducing an ionizable group to the surface of each of its particles. Moreover, it is possible to use a microcapsule type carbon black whose dispersibility is increased by covering the surface of each of its particles with an organic polymer, or the like. Furthermore, it is possible to use a polymer-bonded type self-dispersion carbon black which is reformed (or modified) by chemically bonding an organic group including a polymer to the surface of carbon black particles. Of course, in the present invention, it is also possible to use, in combination, the above-mentioned carbon blacks whose dispersing methods are different. Hereinafter, a carbon black that can be used in the present invention will be described.

As the carbon black which can be used for a black ink used in combination with the ink of the present invention, it is possible to use carbon black such as furnace black, lamp black, acetylene black, and channel black. Specifically, it is possible to use the following products which are commercially available.

Raven: 1170, 1190 ULTRA-II, 1200, 1250, 1255, 1500, 2000, 3500, 5000 ULTRA, 5250, 5750, and 7000 (all available from Colombia Carbon Co.);

Black Pearls L; Regal: 330R, 400R, and 660R; Mogul L; Monarch: 700, 800, 880, 900, 1000, 1100, 1300, 1400, and 2000; and Valcan XC-72R (all available from Cabot Co.);

Color Black: FW1, FW2, FW2V, FW18, FW200, S150, S160, and S170; Printex: 35, U, V, 140U, and 140V; Special Black: 4, 4A, 5, and 6 (all available from Degussa Corp.);

No. 25, No. 33, No. 40, No. 47, No. 52, No. 900, and No. 2300; MCF-88, MA600, MA7, MA8, and MA100 (all available from Mitsubishi Chemical Corporation).

Moreover, it is also possible to use carbon black newly prepared for the present invention. However, the present invention is not limited to these but it is possible to use any one of hitherto known carbon blacks. Moreover, it is also possible to use magnetic fine particles such as magnetite and ferrite, titanium black with a carbon black.

The content (mass %) of the carbon black in the black ink is preferably 0.1 mass % or more and 15.0 mass % or less, or more preferably 1.0 mass % or more and 10.0 mass % or less with respect to the total mass of the black ink.

[Aqueous Medium]

As the aqueous medium used for the black ink, it is preferable to use an aqueous medium containing water, or water and a water-soluble organic solvent. In addition, a poor medium for the above-mentioned carbon black is preferably incorporated into the black ink. It should be noted that the term "carbon black" includes dispersing components such as resin-dispersion carbon black and self-dispersion carbon black. The reason is that by adopting such constitution, it becomes possible to more effectively suppress the bleeding. Furthermore, a poor medium for C.I. Pigment Yellow 74 in the yellow ink to be used in combination with the black ink is particularly preferably a poor medium for the carbon black in the black ink because bleeding can be suppressed especially effectively.

The components which compose an aqueous medium in the black ink used in combination with the ink of the present invention are not particularly limited as long as they meet the above-described preferable conditions, and it is possible to use the same components as those described for the aqueous medium of the ink of the present invention.

[Additives]

In the black ink, in addition to the above component, various additives such as a surfactant, a pH adjustor, a chelating agent, a rust inhibitor, an antiseptic, a mildew proofing agent, a UV absorber, a viscosity modifier, a defoaming agent, and a water-soluble polymer may be incorporated. The same type of additives as those described above may be used as such the additives.

<Ink Jet Recording Method>

The ink according to the present invention is used for an ink jet recording method in which the ink is ejected in accordance with a recording signal to record on a recording medium, to thereby obtain a suitable result. In this case, a preferable ink jet recording method involving applying thermal energy to ink on the recording medium to record thereon.

<Ink Cartridge>

An example of an ink cartridge suitable for performing recording by means of the ink according to the present invention includes an ink cartridge including an ink storage portion for storing the ink. Hereinafter, specific examples of the ink cartridge suitable for recording by means of the ink according to the present invention will be described.

FIG. 1 is a schematic cross-sectional view of an ink cartridge which can be used suitably to perform recording by using the ink of the present invention. As shown in FIG. 1, the ink cartridge communicates with the air through an air communication port 112 in its upper portion, and communicates with an ink supply port in its lower portion. The negative pressure generation member housing chamber 134 and the liquid storage chamber 136 communicate only through a communication hole 140 and an atmospheric air introducing groove (air introducing passage) 150, for accelerating introduction of the air to the liquid storage chamber during liquid supply operation, formed in the partition wall 138 near the bottom of the ink cartridge. On an upper wall of the ink cartridge which constitutes the negative pressure generation member housing chamber 134, a plurality of ribs are formed integrally therewith so as to protrude inside and abut against a negative pressure generation member housed in a compressed state in the negative pressure generation member housing chamber 134. The ribs form an air buffer chamber between the upper wall and the upper surface of the negative pressure generation member. Moreover, in an ink supply cylinder equipped with a liquid supply port 114, a pressure-contacting member 146, whose capillary force is higher than that of the negative pressure generation member and which has a large physical strength, is provided in pressure-contact with the negative pressure generation member.

In the example shown in the figure, in the negative pressure generation member housing chamber 134, there are housed, as negative pressure generation members, two capillary force generation type, negative pressure generation members, including a first negative pressure generation member 132B and a second negative pressure generation member 132A which are composed of fibers of an olefin resin such as polyethylene. Reference character 132C denotes a boundary of these two negative pressure generation members, and a crossing portion of the boundary 132C with the partition wall 138 exists above the upper end of the atmospheric air introducing groove (atmospheric air introducing passage) 150 in the orientation of the ink cartridge when used with the above-mentioned communicating portion being located downward. Moreover, ink contained inside the negative pressure generation member exists up to a position above the boundary 132C, as indicated by a liquid level L of the ink.

Here, at the boundary between the first negative pressure generation member and the second negative pressure generation member, the both layers are pressure-contacted with each other, and there is established a state such that the compressibility is higher and the capillary force is larger in the vicinity of the boundary of the both negative pressure generation members than the other portions. That is, when the capillary force of the first negative pressure generation member is represented by P1, the capillary force of the second negative pressure generation member is represented by P2, and the capillary force of the interface between the both negative pressure generation members is represented by PS, the relationship of P2<P1<PS holds.

Figure 2:
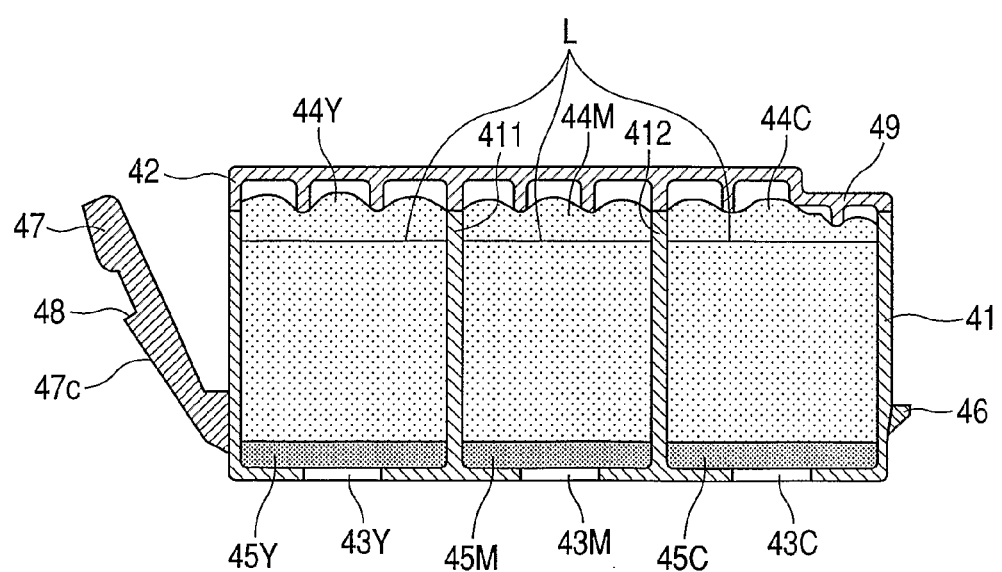
FIG. 2 is a schematic cross-sectional view showing another ink cartridge which is suitable to perform recording by using an ink according to the present invention.

FIG. 2 is a schematic cross-sectional view of another ink cartridge which is suitable to perform recording by using the ink of the present invention. As shown in FIG. 2, the ink cartridge has a container 41 which contains three colors of inks, that is, yellow (Y), magenta (M) and cyan (C) respectively, and a lid member 42 which covers the container 41.

The inside of the container 41 is divided into three spaces, whose volumes are almost equal, with two partition plates 411 and 412 arranged parallel to each other, so as to contain three colors of inks. These three spaces are arranged in a direction of insertion of the color ink cartridge when mounting the color ink cartridge on an ink cartridge holder. Moreover, an ink absorber 44Y which absorbs and holds an yellow ink, an ink absorber 44M which absorbs and holds a magenta ink, and an ink absorber 44C which absorbs and holds a cyan ink are stored in these spaces, respectively. Moreover, the inks contained in the ink absorber 44Y, ink absorber 44M, and ink absorber 44C which are negative pressure generation members each exist up to a position above the corresponding ink absorber as represented by the liquid level L of the ink. Incidentally, in FIG. 2, reference characters 43Y, 43M, and 43C denote ink supply ports; reference characters 45Y, 45M, and 45C denote ink supply members; reference numeral 46 denotes an anti-demounting claw; reference numeral 47 denotes a latch lever; reference numeral 47c denotes a bottom bevel; reference numeral 48 denotes a latch claw; and reference numeral 49 denotes a step portion.

EXAMPLES

Hereinafter, the present invention will be described more specifically by way of examples and comparative examples. The present invention is not limited to the following examples without departing from the gist of the present invention. The terms "part" and "%" in the following description are on a mass basis unless otherwise stated.

<Evaluation of Ink>

Here, the evaluation of ink as an embodiment of the present invention was performed.

(Preparation of Yellow Pigment Dispersion Solution)

10 parts of a pigment (C.I. Pigment Yellow 74), 20 parts of a dispersant, and 70 parts of ion-exchanged water were mixed and dispersed by a batch-type vertical sand mill for 3 hours. After that, the resultant dispersion solution was centrifuged to remove coarse particles. Further, the remainder was filtered through a microfilter having a pore size of 3.0 μm (manufactured by Fuji Photo Film Co., Ltd.) under pressure to prepare a yellow pigment dispersion. After that, water was added to attain a pigment concentration of 10 mass %, thereby preparing a yellow pigment dispersion solution. An aqueous solution prepared by neutralizing a styrene-acrylic acid copolymer having an acid value of 200 and a weight average molecular weight of 10,000 with a 10-mass % aqueous solution of sodium hydroxide was used as the dispersant.

(Determination of Poor Medium and Good Medium of Each Water-Soluble Organic Solvent)

The following test was conducted in order to select a water-soluble organic solvent that acts as a poor medium or a good medium for the above obtained yellow pigment dispersion. Firstly, an aqueous solution with a solid content of 10 mass % of the yellow pigment dispersion solution which was obtained above was prepared. This pigment dispersion solution and respective water-soluble organic solvents were used to prepare a poor medium and a good medium-determination dispersion solution X and a poor medium and a good medium-determination water dispersion solution Y according to the following compositions.

| (Determination dispersion solution X) | |
|---|---|
| Yellow pigment dispersion solution | 50 parts |
| Each water-soluble organic solvent shown in Table 1 | 50 parts |
| (Determination water dispersion solution Y) | |
| Yellow pigment dispersion solution | 50 parts |
| Pure water | 50 parts |

Next, 10 g of the respective determination dispersion solution X and determination water dispersion solution Y prepared as described above were placed in a transparent glass sample bottle with caps, respectively. After the bottles were covered with the cap, the dispersion solutions were sufficiently stirred and then allowed to stand still at 60° C. for 48 hours. After that, as measurement samples, the average particle sizes of the pigments in the settled dispersion solutions were measured using a fiber-optics particle analyzer (product name: FPAR-1000; Otsuka Electronics Co., Ltd.). When the average particle size of the pigments in the determination dispersion solution X was larger than the average particle size of the pigments in the determination water dispersion solution Y, the water-soluble organic solvent contained in the determination dispersion solution X at that time was determined as a poor medium; whereas when the average particle size of the pigments in the determination dispersion solution X was equal to or smaller than the average particle size of the pigments in the determination water dispersion solution Y, the water-soluble organic solvent contained in the determination dispersion solution X at that time was determined as a good medium.

Determination as to whether each of four kinds of water-soluble organic solvents shown in Table 1 corresponded to a poor medium or good medium for the pigment dispersion in the yellow pigment dispersion solution was performed by measuring an average particle size as described above. Table 1 shows the results of the evaluation. With regard to the results in Table 1, the case where a water-soluble organic solvent was determined as a good medium was denoted by o, and the case where a water-soluble organic solvent was determined as a poor medium was denoted by x.

(Measurement of Ka Value of Water-Soluble Organic Solvents)

First, to measure the Ka value of each water-soluble organic solvent, an aqueous dye solution with a dye concentration of 0.5 mass %, having composition shown below, was prepared. Such an aqueous dye solution is used in order to color a colorless transparent sample to make it visible so that the Ka value can be easily measured.

| | |
|---|---|
| C.I. Direct Blue 199 | 0.5 part |
| Pure water | 99.5 parts |

Next, using this aqueous 0.5 mass % dye solution and each water-soluble organic solvent to be measured, each of aqueous 20% solution of colored water-soluble organic solvents having the composition shown below was prepared.

Above aqueous 0.5 mass % dye solution 80 parts

A water-soluble organic solvent shown in Table 1 20 parts

Using as a measuring sample the aqueous 20 mass % solution of each colored water-soluble organic solvent, prepared as described above, the Ka value of the aqueous 20 mass % solution of each water-soluble organic solvent was measured by the Bristow method using a dynamic permeability tester (trade name: Dynamic permeability tester S; manufactured by Toyo Seiki Seisaku-Sho, Ltd.). Table 1 shows the results of the measurement of the Ka value of each water-soluble organic solvent in a 20 mass % aqueous solution.

TABLE 1

| Water-soluble organic solvent | Results of determination with respect to yellow pigment dispersion solution | Ka value of 20-mass % aqueous solution $[ml/m^2/msec^{1/2}]$ |
|---|---|---|
| Glycerin | o | 0.13 |
| 2-pyrrolidone | x | 0.19 |
| 1,5-pentanediol | x | 0.07 |
| Polyethylene glycol 1000 | x | 0.18 |

(Preparation of Inks)

The respective components shown in each of Tables 2 to 4 below were mixed and sufficiently stirred. After that, the resultant was filtered through a microfilter having a pore size of 3.0 μm (manufactured by Fuji Photo Film Co., Ltd.) under pressure to prepare each aqueous ink of each of Examples 1 to 25 and comparative examples 1 to 11. The surface tension at 25° C. of each of the inks of Examples 1 to 25 and comparative Examples 1 to 11 obtained above was measured by using a Kyowa CBVP-2 type surface tension meter (Kyowa Kagaku Co., Ltd.). Tables 2 to 4 show the measured surface tensions of the inks. Each of Tables 2 to 4 shows the content A (mass %) of a pigment, the content B (mass %) of a poor medium, the content C (mass %) of a good medium, and the content D (mass %) of a dye in each ink, and values for B/A, C/B, and A/D×100 or D/A×100.

TABLE 2

|  | Example | | | | | | | | | | | | |
| --- | --- | --- | --- | --- | --- | --- | --- | --- | --- | --- | --- | --- | --- |
|  | 1 | 2 | 3 | 4 | 5 | 6 | 7 | 8 | 9 | 10 | 11 | 12 | 13 |
| C.I. Direct Yellow 86 | 3 |  |  |  |  | 3 |  |  | 3 | 3 | 3 | 3 | 3 |
| C.I. Acid Yellow 23 |  | 3 |  |  |  |  | 3 |  |  |  |  |  |  |
| C.I. Acid Yellow 173 |  |  | 3 |  |  |  |  |  |  |  |  |  |  |
| C.I. Acid Yellow 132 |  |  |  | 3 |  |  |  | 3 |  |  |  |  |  |
| C.I. Acid Yellow 59 |  |  |  |  | 3 |  |  |  |  |  |  |  |  |
| Yellow pigment dispersion solution | 2 | 2 | 2 | 2 | 2 | 6 | 6 | 6 | 10 | 20 | 20 | 20 | 11 |
| Glycerin | 6 | 6 | 6 | 6 | 6 | 6 | 6 | 6 | 6 | 4 | 4 | 6 | 6 |
| 2-pyrrolidone |  |  |  |  |  |  |  |  |  |  |  |  |  |
| 1,5-pentanediol |  |  |  |  |  |  |  |  |  |  |  |  |  |
| Polyethylene glycol 1000 | 3 | 3 | 3 | 3 | 3 | 3 | 3 | 3 | 3 | 1.8 | 2 | 3 | 3 |
| Surfynol 465 (*1) | 0.3 | 0.3 | 0.3 | 0.3 | 0.3 | 0.3 | 0.3 | 0.3 | 0.4 | 0.4 | 0.4 | 0.4 | 0.4 |
| Water | 85.7 | 85.7 | 85.7 | 85.7 | 85.7 | 81.7 | 81.7 | 81.7 | 77.6 | 70.8 | 70.6 | 67.6 | 76.6 |
| Surface tension (mN/m) | 37.5 | 37.8 | 37.4 | 37.7 | 37.6 | 38.2 | 38.4 | 38.1 | 34.7 | 35.8 | 35.9 | 35.4 | 35.2 |
| Content A of a pigment (mass %) | 0.2 | 0.2 | 0.2 | 0.2 | 0.2 | 0.6 | 0.6 | 0.6 | 1 | 2 | 2 | 2 | 1.1 |
| Content B of poor solvent (mass %) | 3 | 3 | 3 | 3 | 3 | 3 | 3 | 3 | 3 | 1.8 | 2 | 3 | 3 |
| Content C of good solvent (mass %) | 6 | 6 | 6 | 6 | 6 | 6 | 6 | 6 | 6 | 4 | 4 | 6 | 6 |
| Content D of dye (mass %) | 3 | 3 | 3 | 3 | 3 | 3 | 3 | 3 | 3 | 3 | 3 | 3 | 3 |
| B/A(—) | 15 | 15 | 15 | 15 | 15 | 5 | 5 | 5 | 3 | 0.9 | 1 | 1.5 | 2.7 |
| C/B(—) | 2 | 2 | 2 | 2 | 2 | 2 | 2 | 2 | 2 | 2.2 | 2 | 2 | 2 |
| A/D × 100 (%) | 6.7 | 6.7 | 6.7 | 6.7 | 6.7 | 20.0 | 20.0 | 20.0 | 33.3 | 66.7 | 66.7 | 66.7 | 36.7 |

(*1) A surfactant (manufactured by Nissin Chemical Industry Co., Ltd.)

TABLE 3

|  | Example | | | | | | | | | | | |
| --- | --- | --- | --- | --- | --- | --- | --- | --- | --- | --- | --- | --- |
|  | 14 | 15 | 16 | 17 | 18 | 19 | 20 | 21 | 22 | 23 | 24 | 25 |
| C.I. Direct Yellow 86 | 0.2 |  |  |  |  | 0.6 |  |  | 0.6 | 0.6 | 1 | 1.1 |
| C.I. Acid Yellow 23 |  | 0.2 |  |  |  |  | 0.6 |  |  |  |  |  |
| C.I. Acid Yellow 173 |  |  | 0.2 |  |  |  |  |  |  |  |  |  |
| C.I. Acid Yellow 132 |  |  |  | 0.2 |  |  |  | 0.6 |  |  |  |  |
| C.I. Acid Yellow 59 |  |  |  |  | 0.2 |  |  |  |  |  |  |  |
| Yellow pigment dispersion solution | 40 | 40 | 40 | 40 | 40 | 40 | 40 | 40 | 40 | 40 | 40 | 40 |
| Glycerin | 5 | 5 | 5 | 5 | 5 | 5 | 5 | 5 | 5 | 4 | 5 | 5 |
| 2-pyrrolidone |  |  |  |  |  |  |  |  |  |  |  |  |
| 1,5-pentanediol |  |  |  |  |  |  |  |  |  |  |  |  |
| Polyethylene glycol 1000 | 3 | 3 | 3 | 3 | 3 | 3 | 3 | 3 | 4 | 9 | 3 | 3 |
| Surfynol 465 (*1) | 0.4 | 0.4 | 0.4 | 0.4 | 0.4 | 0.4 | 0.4 | 0.4 | 0.4 | 0.4 | 0.4 | 0.4 |
| Water | 51.4 | 51.4 | 51.4 | 51.4 | 51.4 | 51.0 | 51.0 | 51.0 | 50.0 | 46.0 | 50.6 | 50.5 |
| Surface tension (mN/m) | 36.5 | 36.8 | 36.7 | 36.4 | 36.5 | 36.7 | 36.8 | 36.2 | 36.4 | 36.7 | 36.4 | 36.7 |
| Content A of pigment (mass %) | 4 | 4 | 4 | 4 | 4 | 4 | 4 | 4 | 4 | 4 | 4 | 4 |
| Content B of poor solvent (mass %) | 3 | 3 | 3 | 3 | 3 | 3 | 3 | 3 | 4 | 9 | 3 | 3 |
| Content C of good solvent (mass %) | 5 | 5 | 5 | 5 | 5 | 5 | 5 | 5 | 5 | 4 | 5 | 5 |
| Content D of dye (mass %) | 0.2 | 0.2 | 0.2 | 0.2 | 0.2 | 0.6 | 0.6 | 0.6 | 0.6 | 0.6 | 1 | 1.1 |
| B/A(—) | 0.75 | 0.75 | 0.75 | 0.75 | 0.75 | 0.75 | 0.75 | 0.75 | 1 | 2.3 | 0.75 | 0.75 |

TABLE 3-continued

| | Example | | | | | | | | | | | |
|---|---|---|---|---|---|---|---|---|---|---|---|---|
| | 14 | 15 | 16 | 17 | 18 | 19 | 20 | 21 | 22 | 23 | 24 | 25 |
| C/B(—) | 1.7 | 1.7 | 1.7 | 1.7 | 1.7 | 1.7 | 1.7 | 1.7 | 1.3 | 0.4 | 1.7 | 1.7 |
| D/A × 100 (%) | 5 | 5 | 5 | 5 | 5 | 15 | 15 | 15 | 15 | 15 | 25 | 27.5 |

(*1) A surfactant (manufactured by Nissin Chemical Industry Co., Ltd.)

TABLE 4

| | Comparative Example | | | | | | | | | | |
|---|---|---|---|---|---|---|---|---|---|---|---|
| | 1 | 2 | 3 | 4 | 5 | 6 | 7 | 8 | 9 | 10 | 11 |
| C.I. Direct Yellow 86 | 3 | | | | | 3 | 3 | | 0.6 | 0.6 | |
| C.I. Acid Yellow 23 | | 3 | | | | | | | | | |
| C.I. Acid Yellow 173 | | | 3 | | | | | | | | |
| C.I. Acid Yellow 132 | | | | 3 | | | | | | | |
| C.I. Acid Yellow 59 | | | | | 3 | | | | | | |
| Yellow pigment dispersion solution | | | | | | | 6 | 10 | 40 | 40 | 40 | 40 |
| Glycerin | 10 | 10 | 10 | 10 | 10 | 10 | 6 | 10 | 10 | 5 | 5 |
| 2-pyrrolidone | | | | | | | 1 | | | 1 | 4 |
| 1,5-pentanediol | | | | | | | 2 | | | 2 | |
| Polyethylene glycol 1000 | 2 | 2 | 2 | 2 | 2 | 0 | | | | | |
| Surfynol 465 (*1) | 0.3 | 0.3 | 0.3 | 0.3 | 0.3 | 0.3 | 0.6 | 0.4 | 0.4 | 0.8 | 0.4 |
| Water | 84.7 | 84.7 | 84.7 | 84.7 | 84.7 | 80.7 | 77.4 | 49.6 | 49.0 | 50.6 | 50.6 |
| Surface tension (mN/m) | 33.6 | 33.4 | 33.5 | 33.6 | 33.2 | 37.4 | 33.2 | 36.9 | 37.1 | 33.9 | 36.6 |
| Content A of a pigment (mass %) | 0 | 0 | 0 | 0 | 0 | 0.6 | 1 | 4 | 4 | 4 | 4 |
| Content B of poor solvent (mass %) | 2 | 2 | 2 | 2 | 2 | 0 | 3 | 0 | 0 | 3 | 4 |
| Content C of good solvent (mass %) | 10 | 10 | 10 | 10 | 10 | 10 | 6 | 10 | 10 | 5 | 5 |
| Content D of dye (mass %) | 3 | 3 | 3 | 3 | 3 | 3 | 3 | 0 | 0.6 | 0.6 | 0 |
| B/A(—) | — | — | — | — | — | 0 | 3 | 0 | 0 | 0.75 | 1 |
| C/B(—) | 5 | 5 | 5 | 5 | 5 | — | 2 | — | — | 1.7 | 1.3 |
| A/D × 100 (%) or D/A × 100 (%) | 0 | 0 | 0 | 0 | 0 | 20 | 33 | 0 | 15 | 15 | 0 |

(*1) A surfactant (manufactured by Nissin Chemical Industry Co., Ltd.)

[Evaluation for Color Developability and Bleeding]

The following evaluation was performed by using the inks of Examples 1 to 12 and comparative Examples 1 to 9 prepared above, and black inks 1 and 2 shown below.

(Preparation of Black Pigment Dispersion Solution 1)

10 parts of carbon black having a specific surface area of 210 m$^2$/g and a DBP oil absorption of 74 ml/100 g, 20 parts of a dispersant, and 70 parts of ion-exchanged water were mixed and dispersed by a sand grinder for 1 hour. After that, the resultant dispersion solution was centrifuged to remove coarse particles. Further, the remainder was filtered through a microfilter having a pore size of 3.0 μm (manufactured by Fuji Photo Film Co., Ltd.) under pressure to prepare a black pigment dispersion. After that, water was added to attain a pigment concentration of 10 mass %, thereby preparing a black pigment dispersion solution 1. An aqueous solution prepared by neutralizing a styrene-acrylic acid copolymer having an acid value of 200 and a weight average molecular weight of 10,000 with a 10-mass % aqueous solution of sodium hydroxide was used as the dispersant.

(Preparation of Black Pigment Dispersion Solution 2)

1.5 g of 4-aminophthalic acid was added in a cooled state of 5° C. to a solution of 5 g of concentrated hydrochloric acid dissolved in 5.5 g of water. This solution was stirred in an ice bath to be always maintained at 10° C. or less and a solution of 1.8 g of sodium nitrite dissolved in 9 g of 5° C. water was added to this solution. After the resulting solution was further stirred for 15 minutes, 6 g of carbon black having a specific surface area of 220 m$^2$/g and a DBP oil absorption of 105 mL/100 g was added and mixed. Thereafter, this solution was stirred for another 15 minutes. The obtained slurry was filtered with a paper filter (trade name: Standard filter paper No. 2; manufactured by ADVANTEC), and pigment particles were thoroughly washed with water and dried in an oven heated at 110° C. to prepare self-dispersion carbon black was prepared. After that, water was added to the obtained self-dispersion carbon black to prepare a black pigment dispersion solution 2 having a pigment concentration of 10 mass %.

(Determination of Poor Medium and Good Medium Of Each Water-Soluble Organic Solvents)

The following test was conducted in order to select a water-soluble organic solvent that acts as a poor medium or a good medium for the above obtained black pigment dispersion solutions 1 and 2 by means of a method similar to a method for determination as to select each water-soluble organic solvent was a poor medium or a good medium for the yellow pigment dispersion solution. Determination as to whether each of four kinds of water-soluble organic solvents shown in Table 5 corresponded to a poor medium or good medium for a pigment dispersion in each black pigment dispersion solution was performed. Table 5 shows the results of the evaluation. With regard to the results in Table 5, the case where a water-soluble organic solvent was determined as a good medium was denoted by o, and the case where a water-soluble organic solvent was determined as a poor medium was denoted by x.

TABLE 5

| Water-soluble organic solvent | Black pigment dispersion solution 1 | Black pigment dispersion solution 2 |
|---|---|---|
| Glycerin | o | o |
| Ethylene glycol | o | o |
| 2-pyrrolidone | x | x |
| 1,5-pentanediol | x | x |
| Polyethylene glycol 1000 | x | x |

(Preparation of Ink)

The respective components shown in Table 6 below were mixed and sufficiently stirred. After that, the resultant was filtered through a microfilter having a pore size of 3.0 µm (manufactured by Fuji Photo Film Co., Ltd.) under pressure to prepare each of the black inks 1 to 3.

TABLE 6

| | Black ink | | |
|---|---|---|---|
| | 1 | 2 | 3 |
| Black pigment dispersion solution 1 | 40.0 | 40.0 | |
| Black pigment dispersion solution 2 | | | 40.0 |
| Glycerin | 7.5 | 7.5 | 7.5 |
| Ethylene glycol | 7.5 | | |
| 2-pyrrolidone | | 7.5 | 7.5 |
| Surfynol 465 (*1) | 0.2 | 0.2 | 0.2 |
| Water | 44.8 | 44.8 | 44.8 |

(*1) A surfactant (manufactured by Nissin Chemical Industry Co., Ltd.)

(Production of Recorded Matter)

A recorded matter was produced by using an ink jet recording apparatus (trade name: PIXUS 950i; manufactured by Canon Inc.), which ejects an ink by an action of thermal energy. To be specific, an ink cartridge having the constitution of FIG. 1 was filled with each of the inks obtained above, the ink cartridge was mounted on the ink jet recording apparatus, and an image was formed. Then, a recorded matter on which a solid image measuring 2 cm×2 cm in a state where a yellow ink and a black ink were adjacent to each other was formed was produced on each of the following four kinds of copy paper (plain paper) by using each of the inks of Examples 1 to 13 and comparative examples 1 to 10, and the black ink 1.

A default mode was selected for a printer driver. Setting conditions for the default mode are as follows.

Type of paper: Plain paper
Printing quality: Standard
Color adjustment: Automatic The following four kinds of copy papers (plain papers) were used as recording media.

PPC paper PB (manufactured by CANON Inc.)
PPC paper 4024 (manufactured by Xerox Co., Ltd.)
PPC paper Proberbond (manufactured by Fox River)
PPC paper for Canon (manufactured by Neusiedler)

(Color Developability and Bleeding)

1 day after the production of the recorded matters, the degree of bleeding at a portion where an image formed with the black ink 1 and an image formed with any one of the inks of the examples were adjacent to each other was visually observed. In addition, the degree of bleeding at a portion where an image formed with the black ink 1 and an image formed with any one of the inks of the comparative examples were adjacent to each other was visually observed in the same manner, and a recorded matter of each of the examples and a recorded matter of each of the comparative examples were compared with each other for evaluation. Furthermore, an optical density in a yellow image was measured by using a Macbeth RD915 (manufactured by GRETAG MACBETH AG.). The evaluation criteria for color developability and bleeding are as described below. Table 7 shows the results of the evaluation. The results of the evaluation in Table 7 were common to all recording media used.

A: An image is clearly superior to an image formed with the ink of each of the comparative examples in both color developability and suppression of bleeding.

B: An image is superior to an image formed with the ink of each of the comparative examples in one of color developability and suppression of bleeding.

C: An image does not differ from an image formed with the ink of each of the comparative examples in color developability and suppression of bleeding.

TABLE 7

| | | Color developability and bleeding |
|---|---|---|
| Example | 1 | B |
| | 2 | B |
| | 3 | B |
| | 4 | B |
| | 5 | B |
| | 6 | A |
| | 7 | A |
| | 8 | A |
| | 9 | A |
| | 10 | A |
| | 11 | A |
| | 12 | A |
| | 13 | A |

The results of the evaluation of examples 11 and 12 were superior to those of examples 6 to 10 and 13 in both color developability and suppression of bleeding.

A recorded matter on which a solid image measuring 2 cm×2 cm in a state where the yellow ink of example 1 and the black ink 2 were adjacent to each other was formed was produced in the same manner as that described above except for the use of the black ink 2 instead of the black ink 1. Immediately after the production of the recorded matter, the degree of bleeding at a portion where an image formed with the black ink 2 and an image formed with any one of the inks of the examples were adjacent to each other was visually observed. A recorded matter produced by using the black ink 3 was compared with the above recorded matter produced by using the yellow ink of example 1 and the black ink 2 for evaluation. As a result, the recorded matter produced by using the black ink 3 was superior to the recorded matter produced by using the black ink 2 in suppression of bleeding.

A recorded matter on which a solid image measuring 2 cm×2 cm in a state where the yellow ink of example 1 and the black ink 3 were adjacent to each other was formed was produced in the same manner as that described above except for the use of the black ink 3 instead of the black ink 2.

Immediately after the production of the recorded matter, the degree of bleeding at a portion where an image formed with the black ink 3 and an image formed with any one of the inks of the examples were adjacent to each other was visually observed. A recorded matter produced by using the black ink 3 was compared with the above recorded matter produced by using the yellow ink of example 1 and the black ink 2 for evaluation. As a result, the recorded matter produced by using the black ink 2 was superior to the recorded matter produced by using the black ink 1 in suppression of bleeding.

<Evaluation of Red Image for Chroma>

The following evaluation was performed by using each of the inks of examples 14 to 25 and comparative examples 8 to 11 prepared above, and magenta ink shown below.

| | |
|---|---|
| C.I. Acid Red 52 | 2.4 mass % |
| Glycerin | 3.6 mass % |
| Polyethylene glycol 1000 | 1.0 mass % |
| Surfynol 465 (surfactant; manufactured by Nissin Chemical Industry Co., Ltd.) | 1.0 mass % |
| Water | 92.0 mass % |

(Production of Recorded Matter)

A recorded matter was produced by using an ink jet recording apparatus (trade name: PIXUS 950i; manufactured by Canon Inc.), which ejects an ink by an action of thermal energy. To be specific, an ink cartridge having the constitution of FIG. 1 was filled with each of the inks obtained in the foregoing, the ink cartridge was mounted on the ink jet recording apparatus, and an image was formed. Then, a solid image measuring 2 cm×2 cm of each color and a solid image (secondary color image) measuring 2 cm×2 cm where respective colors were mixed at a ratio of 50:50 on a recording medium were each formed by using each of the inks of examples 14 to 25 and comparative examples 8 to 11, and the magenta ink. The printer driver and the recording medium were the same as those described above.

(Chroma of Red Image)

1 day after the production of the recorded matter, chroma in each of a yellow image and a secondary color image was measured by using a Spectrolino (manufactured by GRETAG MACBETH AG.). Chroma can be determined from the expression $c^* = (a^{*2} + b^{*2})^{1/2}$. The evaluation criteria for chroma are as described below. Table 8 shows the results of the evaluation. The results of the evaluation in Table 8 were common to all recording media used.

A: An image is clearly superior to an image formed with an ink of each of the comparative examples in chroma of each of a yellow image and a secondary color image.

B: An image is clearly superior to an image formed with an ink of each of the comparative examples in chroma of one of a yellow image and a secondary color image.

C: An image does not differ from an image formed with an ink of each of the comparative examples in chroma of each of a yellow image and a secondary color image.

TABLE 8

| | | Chroma |
|---|---|---|
| Example | 14 | B |
| | 15 | B |
| | 16 | B |
| | 17 | B |
| | 18 | B |
| | 19 | A |
| | 20 | A |

TABLE 8-continued

| | | Chroma |
|---|---|---|
| | 21 | A |
| | 22 | A |
| | 23 | A |
| | 24 | A |
| | 25 | A |

Although examples 19, 22, and 23 were exactly identical to each other in kinds and contents of a dye and a pigment in ink, the chroma of each of a yellow image and a secondary color image in example 23 was the best. Example 22 was also superior to example 19 in chroma of each of a yellow image and a secondary color image although example 22 was slightly inferior to example 23 in chroma.

The recorded matter produced in each of examples 9, 13, 24, and 25 was set in a low-temperature cycle xenon weather meter (trade name: XL-75C; manufactured by SUGA TEST INSTRUMENTS Co., Ltd.), and was exposed for 1 week under conditions including a radiation intensity of 100 kiloluxes, a temperature in the chamber of 23° C., and a relative humidity of 55%. The degree of uniformity in a yellow solid image before and after the light resistance test was visually identified, and evaluation for color fading balance was performed. As a result, example 13 was inferior to example 9 in uniformity. In addition, example 25 was inferior to example 24 in uniformity.

<Evaluation for Storage Stability>

Each of the inks of examples 1 to 25 prepared above was charged into a shot bottle, and the bottle was tightly stopped. Then, the bottle was stored in an oven at 60° C. for 2 weeks. The average particle sizes of a pigment and the viscosities of the ink before and after the storage at 60° C. were measured, and a rate of change in average particle size and a rate of change in viscosity were determined. Then, evaluation was performed on the basis of the respective resultant rates of change. The evaluation criteria for storage stability are as described below. Table 9 shows the results of the evaluation.

A: A rate of change in average particle size of a pigment or a rate of change in viscosity of ink before and after storage at 60° C. is 5% or less.

B: A rate of change in average particle size of a pigment or a rate of change in viscosity of ink before and after storage at 60° C. is more than 5% and 10% or less.

C: After storage at 60° C., ink changes into a gel, the upper portion of the ink becomes transparent, or the ink clearly thickens.

TABLE 9

| | | Storage stability |
|---|---|---|
| Example | 1 | B |
| | 2 | B |
| | 3 | B |
| | 4 | B |
| | 5 | B |
| | 6 | B |
| | 7 | B |
| | 8 | B |
| | 9 | A |
| | 10 | A |
| | 11 | A |
| | 12 | A |
| | 13 | A |
| | 14 | A |
| | 15 | A |

TABLE 9-continued

|    | Storage stability |
|----|-------------------|
| 16 | A |
| 17 | A |
| 18 | A |
| 19 | A |
| 20 | A |
| 21 | A |
| 22 | A |
| 23 | A |
| 24 | A |
| 25 | A |

<Evaluation of Method of Producing Ink Jet Ink>

Here, the evaluation of ink obtained by means of the method of producing ink jet ink as another embodiment of the present invention was performed.

The respective components shown in Table 10 below were mixed and sufficiently stirred. After that, the resultant was filtered through a microfilter having a pore size of 3.0 μm (manufactured by Fuji Photo Film Co., Ltd.) under pressure to prepare an ink A. The ink A contains C.I. Pigment Yellow 74 and a poor medium for C.I. Pigment Yellow 74.

TABLE 10

|  | Composition |
|---|---|
| C.I. Direct Yellow 132 | 2.4 |
| Yellow pigment dispersion solution | 36 |
| Glycerin | 10 |
| Polyethylene glycol 1000 | 7 |
| Surfynol 465 (*1) | 0.3 |
| Water | 44.3 |

(*1) A surfactant (manufactured by Nissin Chemical Industry Co., Ltd.)

Ink tanks having the structure illustrated in FIG. 1 were filled with 14.5 g of the ink A prepared according to the formulation shown in Table 10. Then, 12.5 g of the ink was discharged from the ink cartridge. After that, the ink cartridge was filled with 10.0 g of respective inks prepared in comparative examples 1 to 6, whereby each of inks of examples 26 to 31 was prepared. Those inks were extracted from the ink cartridge, and were analyzed for composition. As a result, each of them was found to have the composition shown in Table 11 below.

TABLE 11

|  | Example | | | | | |
|---|---|---|---|---|---|---|
|  | 26 | 27 | 28 | 29 | 30 | 31 |
| C.I. Direct Yellow 86 | 3 | | | | | 3 |
| C.I. Acid Yellow 23 | | 3 | | | | |
| C.I. Direct Yellow 173 | | | 3 | | | |
| C.I. Direct Yellow 132 | 0.4 | 0.4 | 0.4 | 3.4 | 0.4 | |
| C.I. Direct Yellow 59 | | | | | 3 | |
| C.I. Pigment Yellow 74 | 0.6 | 0.6 | 0.6 | 0.6 | 0.6 | 1.2 |
| Styrene-acrylic acid copolymer (*2) | 1.2 | 1.2 | 1.2 | 1.2 | 1.2 | 2.4 |
| Glycerin | 10 | 10 | 10 | 10 | 10 | 10 |

TABLE 11-continued

|  | Example | | | | | |
|---|---|---|---|---|---|---|
|  | 26 | 27 | 28 | 29 | 30 | 31 |
| Polyethylene glycol 1000 | 2 | 2 | 2 | 2 | 2 | 1.2 |
| Acetylene glycol ethylene oxide adduct | 0.3 | 0.3 | 0.3 | 0.3 | 0.3 | 0.3 |
| Water | 82.5 | 82.5 | 82.5 | 82.5 | 82.5 | 81.9 |
| Surface tension (mN/m) | 37.1 | 37.3 | 37.2 | 37.5 | 37.3 | 35.8 |

(*2) Acid value of 200 and weight average molecular weight of 10,000

(Production of Recorded Matter)

A recorded matter was produced by using each of the inks of examples 26 to 31. An ink jet recording apparatus (trade name: PIXUS 950i; manufactured by Canon Inc.), which ejects an ink by an action of thermal energy was used for producing the recorded matter. To be specific, the ink cartridge obtained above was mounted on the ink jet recording apparatus, and an image was formed. Then, evaluation was performed by using each of the inks of examples 26 to 31 in the same manner as that of the evaluation for color developability and bleeding performed in example 1 and on the basis of the same criteria as those of the evaluation. Table 12 shows the results of the evaluation. Comparative examples in the evaluation criteria at this time are comparative examples 1 to 11 as in the case of the foregoing.

TABLE 12

|  |  | Color developability and bleeding |
|---|---|---|
| Example | 26 | A |
|  | 27 | A |
|  | 28 | A |
|  | 29 | A |
|  | 30 | A |
|  | 31 | A |

This application claims priority from Japanese Patent Application No. 2005-170334 filed Jun. 10, 2005, which is hereby incorporated by reference herein.

The invention claimed is:

1. An ink jet ink comprising water, coloring materials, and a water-soluble organic solvent,
   wherein the coloring materials comprise (a) at least one dye selected from the group consisting of C.I. Direct Yellow 86, C.I. Acid Yellow 23, C.I. Direct Yellow 173, C.I. Direct Yellow 132, and C.I. Direct Yellow 59, and (b) C.I. Pigment Yellow 74,
   wherein the water-soluble organic solvent comprises a poor medium for C.I. Pigment Yellow 74, and
   wherein a surface tension of the ink is 34.0 mN/m or more.

2. The ink jet ink according to claim 1, wherein a ratio (B/A) of a content B (mass %) of the poor medium in the ink to a content A (mass %) of C.I. Pigment Yellow 74 in the ink is 1 or more and 4 or less.

3. The ink jet ink according to claim 1, wherein the surface tension of the ink is 41.0 mN/m or less.

4. A method of producing the ink jet ink according to claim 1, comprising the step of injecting an ink comprising at least one dye selected from the group consisting of C.I. Direct Yellow 86, C.I. Acid Yellow 23, C.I. Direct Yellow 173, C.I. Direct Yellow 132, and C.I. Direct Yellow 59 as a coloring material into an ink cartridge storing an ink which comprises C.I. Pigment Yellow 74 and a poor medium for C.I. Pigment Yellow 74, and which has a surface tension of 34.0 mN/m or more.

5. The ink jet ink produced by the method according to claim 4.

6. An ink jet recording method comprising ejecting an ink by an ink jet method, wherein the ink jet ink according to claim 1 is used as the ink.

7. An ink jet recording method comprising ejecting an ink by an ink jet method, wherein the ink jet ink according to claim 5 is used as the ink.

8. An ink cartridge comprising an ink storage portion for storing an ink, wherein the ink storage portion stores the ink jet ink according to claim 1.

9. An ink cartridge comprising an ink storage portion for storing an ink, wherein the ink storage portion stores the ink jet ink according to claim 5.

10. A yellow ink to be used in combination with a black ink comprising water, carbon black, and a water-soluble organic solvent, the yellow ink comprising:

coloring materials comprising (a) at least one dye selected from the group consisting of C.I. Direct Yellow 86, C.I. Acid Yellow 23, C.I. Direct Yellow 173, C.I. Direct Yellow 132, and C.I. Direct Yellow 59, and (b) C.I. Pigment Yellow 74; and a water-soluble organic solvent comprising a poor medium for C.I. Pigment Yellow 74, wherein a surface tension of the yellow ink is 34.0 mN/m or more.

11. The yellow ink according to claim 10, wherein the poor medium for C.I. Pigment Yellow 74 in the yellow ink comprises a poor medium for carbon black in the black ink.

* * * * *